US010625806B2

(12) United States Patent
Christen

(10) Patent No.: US 10,625,806 B2
(45) Date of Patent: Apr. 21, 2020

(54) CONVERTIBLE SCOOTER FOR CARRYING CARGO

(71) Applicant: FORD MOTOR COMPANY, Dearborn, MI (US)

(72) Inventor: Urs Christen, Aachen (DE)

(73) Assignee: FORD MOTOR COMPANY, Dearborn, MI (US)

( * ) Notice: Subject to any disclaimer, the term of this patent is extended or adjusted under 35 U.S.C. 154(b) by 200 days.

(21) Appl. No.: 15/861,858

(22) Filed: Jan. 4, 2018

(65) Prior Publication Data

US 2018/0194422 A1     Jul. 12, 2018

(30) Foreign Application Priority Data

Jan. 9, 2017    (DE) .................. 10 2017 200 154

(51) Int. Cl.
*A63C 5/08*     (2006.01)
*B62K 3/00*    (2006.01)
(Continued)

(52) U.S. Cl.
CPC .............. *B62K 3/002* (2013.01); *B62D 33/02* (2013.01); *B62K 7/04* (2013.01); *B62K 11/00* (2013.01); *B62K 13/00* (2013.01); *B62K 15/006* (2013.01); *B62M 6/60* (2013.01); *B62D 24/04* (2013.01); *B62K 11/14* (2013.01);
(Continued)

(58) Field of Classification Search
CPC .......... B62K 3/002; B62K 5/00; B62K 5/003; B62K 5/007; B62K 5/05; B62K 7/00; B62K 7/04; B62K 15/00; B62K 15/006; B62K 2015/005; B62K 21/00; B62K 21/12; B62K 21/125; B62K 2202/00; B62M 6/00; B62M 6/60; B62M 6/40; B62M 6/50; B62M 6/45; B62M 6/80; B62D 33/02; B62B 3/00; B62B 3/02; B62B 3/027; B62B 3/001; B62B 3/022; B62B 5/0033; B62B 5/0043; B62B 5/0059; B62B 5/0063; B62B 5/06; B62B 5/067

See application file for complete search history.

(56) References Cited

U.S. PATENT DOCUMENTS 6,474,427 B1 * 11/2002 Tunnecliff ............. B62B 5/0026
                                                                180/19.1
7,086,491 B2 * 8/2006 Matte ..................... A61G 5/042
                                                                180/65.1
(Continued)

*Primary Examiner* — James M Dolak
(74) *Attorney, Agent, or Firm* — Gregory P. Brown; Brooks Kushman P.C.

(57) ABSTRACT

A scooter has a load-carrying deck, a steering rod for steering a front wheel, two outriggers arranged on opposite sides to be pivotable between retracted stowed positions and extended support positions. Each outrigger has a wheel mounted movably on the outrigger to move between a stowed position and a ground-contacting support position. The outriggers when in their support position form a wider loading surface than the deck alone. A control arm is attached to the steering rod for movement between a folded/stowed position lying adjacent to the rod and an operating position extending forward from the steering rod. A sensor detects movement of at least a section of the control arm and, in response thereto, provides control inputs to an electric motor driving a rear wheel.

17 Claims, 3 Drawing Sheets

(51) Int. Cl.
    *B62K 15/00*     (2006.01)
    *B62M 6/60*     (2010.01)
    *B62D 33/02*     (2006.01)
    *B62K 7/04*     (2006.01)
    *B62K 13/00*     (2006.01)
    *B62K 11/00*     (2006.01)
    *B62D 24/04*     (2006.01)
    *B62K 11/14*     (2006.01)

(52) U.S. Cl.
    CPC .... *B62K 2015/005* (2013.01); *B62K 2202/00* (2013.01); *B62K 2204/00* (2013.01)

(56) References Cited

U.S. PATENT DOCUMENTS

| | | | | |
|---|---|---|---|---|
| 7,322,434 B1 * | 1/2008 | Hussain | | B62H 1/12 |
| | | | | 180/180 |
| 7,635,037 B2 * | 12/2009 | Treadwell | | B62B 5/005 |
| | | | | 180/19.3 |
| 8,201,838 B2 * | 6/2012 | Abel | | B62K 3/002 |
| | | | | 280/62 |
| 8,365,850 B2 * | 2/2013 | Gal | | B62B 5/0026 |
| | | | | 180/65.1 |
| 8,424,628 B1 * | 4/2013 | Schade | | B62K 11/007 |
| | | | | 180/273 |
| 9,050,225 B2 * | 6/2015 | Ooka | | B62J 1/28 |
| 9,051,019 B2 * | 6/2015 | Reck | | B62K 3/002 |
| 9,862,434 B2 * | 1/2018 | Radenbaugh | | B62D 51/02 |
| 10,232,906 B2 * | 3/2019 | Bieler | | B62M 6/65 |
| 10,266,223 B2 * | 4/2019 | Shinde | | B62B 3/00 |
| 10,299,875 B2 * | 5/2019 | Schoenig | | A61G 7/0503 |
| 10,426,240 B2 * | 10/2019 | Yamamoto | | A45C 13/262 |
| 2006/0191726 A1 * | 8/2006 | Matte | | A61G 5/042 |
| | | | | 180/65.1 |
| 2016/0096578 A1 | 4/2016 | Fan | | |

* cited by examiner

CONVERTIBLE SCOOTER FOR CARRYING CARGO

CROSS-REFERENCE TO RELATED APPLICATIONS

This application claims foreign priority benefits under 35 U.S.C. § 119(a)-(d) to DE Application 10 2017 200 154.2 filed Jan. 9, 2017, which is hereby incorporated by reference in its entirety.

TECHNICAL FIELD

The invention concerns a scooter with a central deck on which a load can be placed, and a steering rod for steering a front wheel of the scooter.

BACKGROUND

A scooter in the context of the invention is a transport means which has relatively small wheels (in comparison with a bicycle, for example), a deck which is arranged very close to the ground and on which a rider may stand and which can also be called a footboard, and a long steering rod extending upward from the low-mounted deck to position a handlebar at a height that it may be conveniently grasped by the standing rider. Such a scooter may for example be configured as a human-propelled "kick scooter" or as an electric motor scooter.

Such scooters are used by a wide range of persons for personal mobility. Folding scooters also have the advantage over other transport means of being lightweight in comparison with a bicycle and, when not being ridden, can be carried/transported in relatively compact form by one person without great exertion being required.

A scooter of the type cited initially is known for example from US 2016/0096578 A1.

SUMMARY

The scooter disclosed herein comprises a deck on which a load may be placed, and a steering rod or column for steering a front wheel of the scooter. Furthermore, the scooter comprises two outriggers arranged on opposite sides of the deck, each having at least one strut which is hinge-mounted on the deck so as to be pivotable between a retracted stowed position and an extended support position, and at least one outrigger wheel which is mounted movably on the strut and can be transferred from a stowed position to a support position, and vice versa, by a pivot movement of the strut or via a support lever holding the outrigger wheel and pivotably mounted on the strut. The deck and the struts, when the struts are in their support position, form a wider loading surface than the deck alone.

Also, the scooter comprises at least one control arm which is connected to the steering rod so as to be immovable relative to a turn direction (clockwise and counterclockwise rotation) of the steering rod, and which has at least one arm section which is connected to the steering rod so as to be pivotable about a pivot axis oriented transversely to a longitudinal center axis of the steering rod, and which is arranged on the steering rod so as to be pivotable between a retracted stowed position and an extended operating position.

The scooter disclosed herein may be easily be used optionally as a personal transport device or as a goods transport device.

The scooter is adapted for use as a personal transport device when the outriggers are in their respective stowed positions, and the control arm is in its stowed position in which it is configured in a compact, space-saving fashion. In this state of the scooter, the loading surface is largely or completely formed by the central deck and the scooter may be used as a personal transport device in the same way as a conventional scooter. However, the side outriggers may also be moved to their respective extended laterally supporting states in order to support the scooter laterally during personal transport.

The scooter is adapted for use as a goods transport means when the side outriggers are in their respective supporting states in which the respective strut and outrigger wheel arranged thereon are in their support positions, and the control arm is in its forward-extending operating position. In this state of the scooter, the loading surface is formed both by the deck and by the struts, and is therefore larger, in particular wider, than the deck alone when the scooter is in its state as a personal transport device. In this state of the scooter, an object, for example a suitcase or similar, may be placed on the wider loading surface or deck and the struts protruding laterally therefrom. Then a person can grip the forward-extending control arm in order to pull the scooter behind him/her and be able to steer it by moving the control arm laterally. In this way, the scooter is suitable for example for transporting luggage, parcels, shopping bags, shopping baskets or other objects.

The scooter according to the invention comprises the central deck on which a load, in particular a person or an object, may be placed. In top view or when viewed from above, the deck extends substantially centrally between a rear wheel of the scooter and the front wheel. On its upper side facing the load or the loading surface formed thereby, the deck may at least partially be provided with a high-friction surface.

The steering rod or column connects a handlebar of the scooter to a wheel fork for example, wherein the steering rod and the wheel fork are connected to the deck via at least one steering bearing so as to be movable about the longitudinal center axis of the steering rod.

At one end, each outrigger strut may be connected in hinged or articulated fashion to the deck such that it can pivot substantially exclusively in a plane defined by the deck or the loading surface or a portion thereof. This ensures that the deck and the struts, in their respective support positions, form a flat loading surface. Each strut may be made from a profile element of metal, plastic or a fiber composite material. In its retracted stowed position, the respective strut may be located next to or partially or completely below the deck. In its extended support position, the strut protrudes laterally from the deck, for example enclosing an acute angle between the strut and the deck.

The outrigger wheels mounted movably on the respective strut may provide lateral support of the scooter when the outriggers are in their respective support positions, so that it does not fall over. The struts and the outrigger wheels are here in their respective support positions. This allows the scooter to be used as a goods transport device which a person can pull behind him/her and steer by moving the control arm.

The respective outrigger wheel may be transferred from a stowed position to a support position by a pivot movement of the strut. This means that the pivoting of strut automatically, for example via forced guidance, causes a movement of the outrigger wheel arranged thereon. When the respective strut is pivoted from its stowed position into its support position, the outrigger wheel is automatically transferred from its stowed/raised position to its support/lowered position. Alternatively, the respective outrigger wheel may be transferred from its stowed position into its support position, and vice versa, manually via the supporting lever which holds the outrigger wheel and is hinged pivotably on the strut, in that for example the supporting lever together with the outrigger wheel can be pivoted between a stowed position further away from the ground to a support position nearer to the ground.

The fact that the control arm is connected with the steering rod so as to be immovable relative to a clockwise/counterclockwise turn direction of the steering rod means that a lateral force exerted on the control arm in the turn direction is transferred completely to the steering rod which is thereby rotated, allowing steering of the scooter via the control arm.

In particular, the control arm may be connected to the steering rod so as to be pivotable about a pivot axis oriented perpendicular to the longitudinal center axis of the steering rod. In its retracted stowed position, the control arm is arranged compactly on the steering rod, preferably closely adjacent and parallel thereto. In its extended operating position, the control arm extends forwardly from the scooter so that it can be gripped by a person in order to pull the scooter, where applicable with any transport object placed thereon, behind him/her and be able to steer it. The control arm may have one or more arm sections connected together telescopically or in articulated fashion to enable compact stowage when the control arm is not in use. The control arm may have a handle or similar which is arranged on the individual steering arm section or on a steering arm section not directly connected to the steering rod.

According to an advantageous embodiment, the scooter comprises at least two support braces connected movably to a respective strut and connected movably to the deck. The support braces serve to support or hold the struts in their extended support position, which increases the robustness of the scooter with the struts extended and counters an overload of the struts with subsequent deformation of the struts. Each support brace may be connected firstly to the respective strut in articulated fashion, and secondly to the deck via a guide, in particular a linear guide or rail guide. Alternatively, each support brace may be connected firstly to the deck in articulated fashion, and secondly to the respective strut via a guide, in particular a linear guide or rail guide.

According to a further advantageous embodiment, the scooter comprises at least one securing means for securing the retracted stowed position and/or the extended support position of the respective strut, the stowed position and/or support position of the respective outrigger wheel, and/or the retracted stowed position and/or extended operating position of the control arm. In this way, it can be ensured that the struts, the outrigger wheels or the control arm cannot move uncontrolledly between their respective function positions under the effect of a force. This increases the travel safety of the scooter.

According to a further advantageous embodiment, each outrigger wheel in its support position is arranged on the respective strut so as to be pivotable about a rotation axis oriented parallel to a scooter vertical axis. This prevents the outrigger wheels themselves initiating a steering process or hindering a steering process initiated by operation of the handlebar or control arm. The respective outrigger wheel may rotate freely about the respective rotation axis.

According to a further advantageous embodiment, the steering rod is connected to the deck via a joint which can be locked in at least two function positions. The scooter can be folded up in that the steering rod, with the joint not locked, is pivoted closely up to the deck. This brings the scooter into a compact and space-saving form which facilitates transport by one person and storage. The joint can then be locked so that the scooter cannot unfold independently under the effect of force. As a second function position, preferably the joint can be locked in the position in which the scooter is fully unfolded.

According to a further advantageous embodiment, the scooter comprises at least one electric drive with at least one electric motor for driving at least one rear wheel of the scooter, and at least one operating means for controlling the electric motor and arranged on a handlebar of the scooter. Accordingly, the scooter is formed as an electric motor scooter, the speed of which can be controlled by the operating means on the handlebar.

According to a further advantageous embodiment, the control arm has at least two arm sections which are connected together so as to be pivotable about a pivot axis oriented transversely to the longitudinal center axis of the steering rod, wherein the scooter has at least one sensor unit which can detect a momentary angle between the arm section hinged to the steering rod and the steering rod, or a momentary angle between the two arm sections, wherein the electric drive comprises at least one data processing unit connected to the sensor unit and configured to control and/or regulate the electric motor depending on the detected momentary angle.

The data processing unit may actuate the electric motor such that the scooter accelerates when the detected momentary angle lies above a predefined minimum value and is increasing, i.e. if a person is pulling on the arm section not directly connected to the steering rod or walking faster than the scooter is travelling. Furthermore, the data processing unit may actuate the electric motor such that the scooter is slowed or braked when the detected momentary angle lies above the minimum value and is reducing, i.e. if the scooter is travelling more quickly than the person holding the steering arm section not directly connected to the steering rod. The control arm formed by the steering arm sections should be configured sufficiently long for a person to be able to hold its end remote from the steering arm and walk comfortably without being hit by the scooter in the case of a sudden stop. If the detected momentary angle is reducing, the data processing unit may actuate the electric motor such that the electric motor generates a negative torque. In this mode of operation (commonly referred to as regenerative braking), electrical energy can be recovered by the electric motor in order to be able to recharge the electric energy accumulator of the electric drive.

According to a further advantageous embodiment, the scooter comprises at least one operating element partially shielding the rear wheel from above, by actuation of which a braking process can be implemented. A person standing on the deck may thus actuate the operating element with a foot in order to initiate a braking process. The operating element may simultaneously be formed as a protective shield to provide protection against contact and splash water. For example, the operating element may be displaced by its operation such that it comes into contact with a running surface of the rear wheel and thus, or by the resulting friction, brakes the rear wheel and hence the scooter.

According to a further advantageous embodiment, the scooter comprises at least one sensor device connected to the data processing unit and detecting the momentary position of the operating element, wherein the data processing unit is configured to control and/or regulate the electric motor depending on the detected momentary position of the operating element. The data processing unit may be configured to actuate the electric motor in a regenerative braking mode wherein the electric motor generates a negative torque which brakes the scooter in reaction to the extent of the respective operation of the operating element. Electrical energy can thus be generated or recovered by the electric motor in order to recharge an electrical energy storage unit of the electric drive.

According to a further advantageous embodiment, the scooter comprises at least one seat unit which can be connected to the deck in such a manner as to be removable non-destructively. In this way, in particular when the scooter is formed as an electric motor scooter, a person in a seated position can be transported comfortably by the scooter. Here, if necessary, the person may bring the lateral outriggers into their respective supporting states as described above. This stabilizes the scooter, which is advantageous for insecure persons and persons with disrupted sense of balance.

The invention is now explained below with reference to a preferred exemplary embodiment shown in the attached figures, wherein the features listed below, both individually and in various combinations with each other, may constitute advantageous or refined aspects of the invention. The drawings show:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An exemplary embodiment of the invention is described below with reference to the attached figures.

Figure 1:
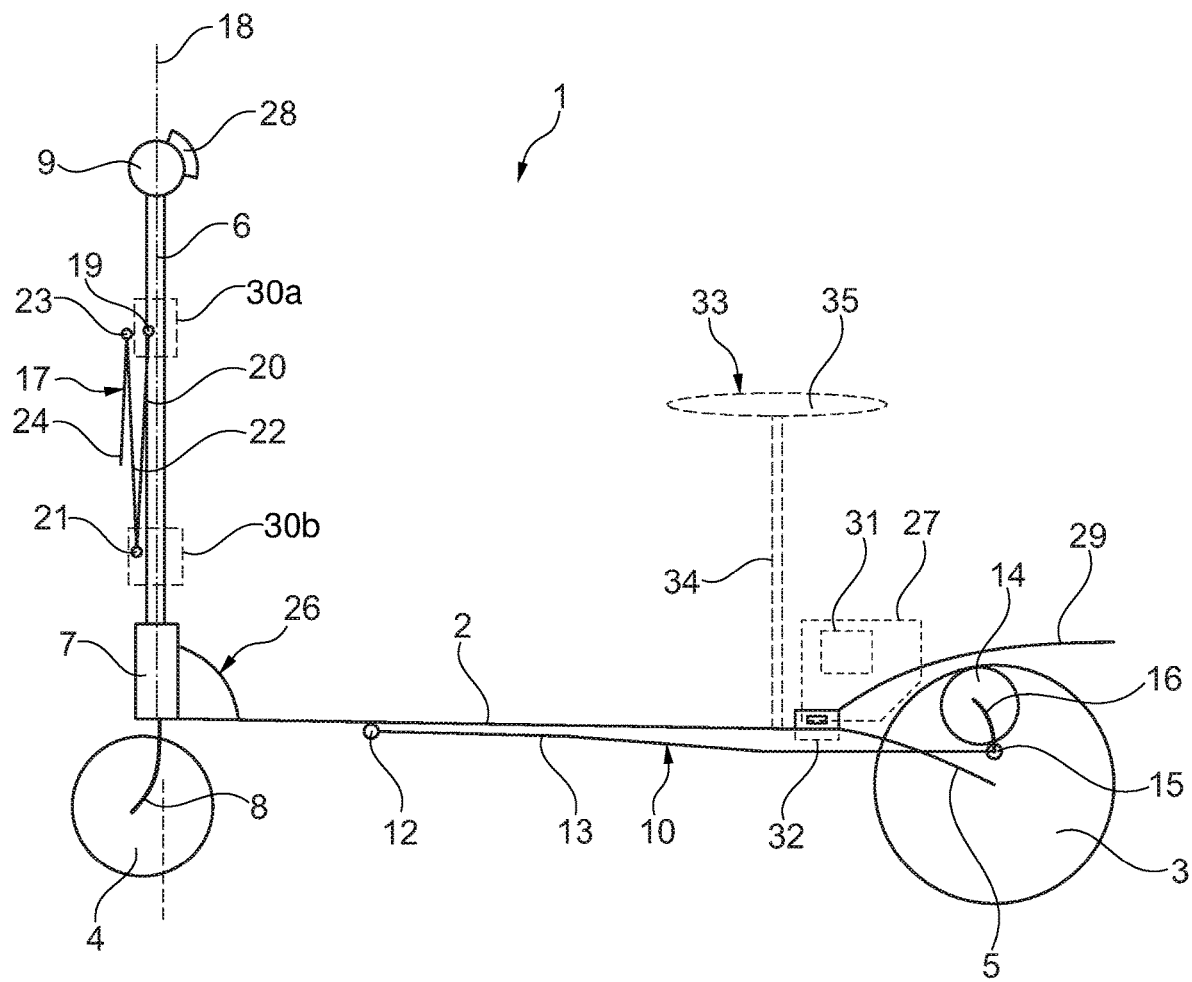
FIG. 1 is a diagrammatic side view of an exemplary embodiment of a scooter according to the invention in a first function state.
Figure 2:
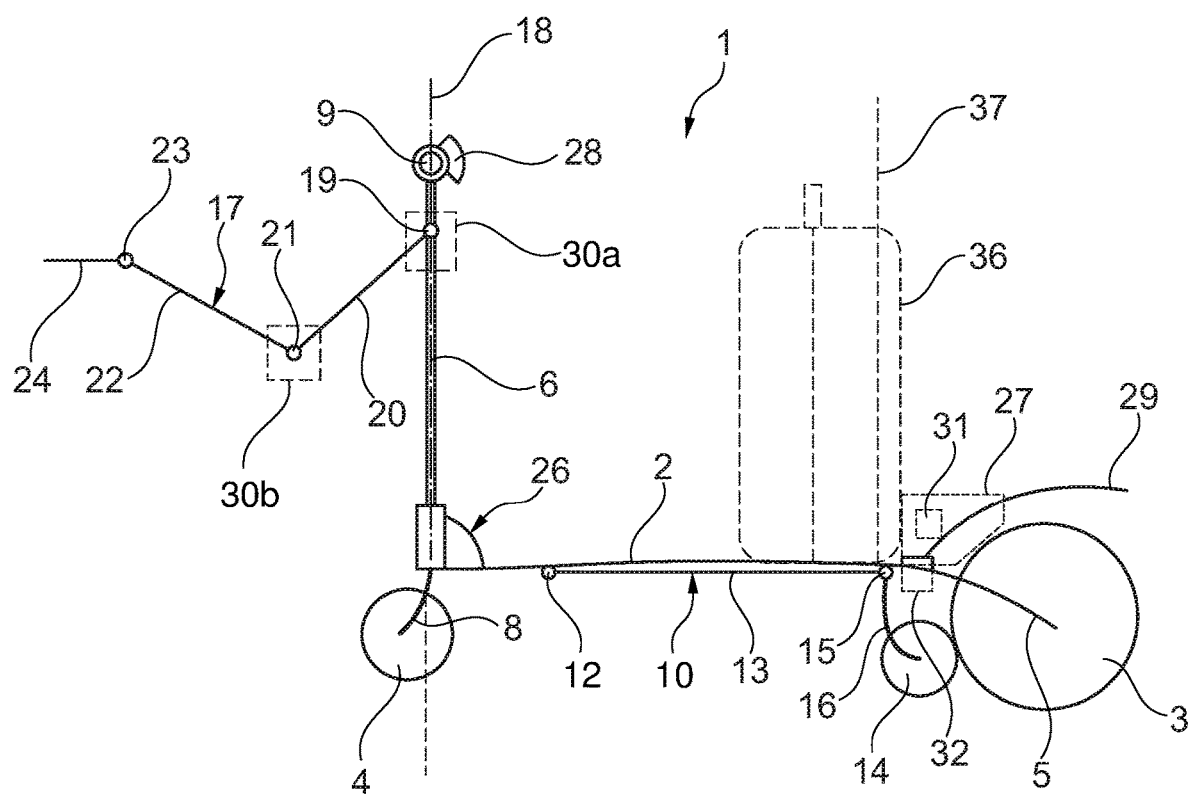
FIG. 2 is a diagrammatic side view of the scooter shown in FIG. 1 in a second function state.
Figure 3:
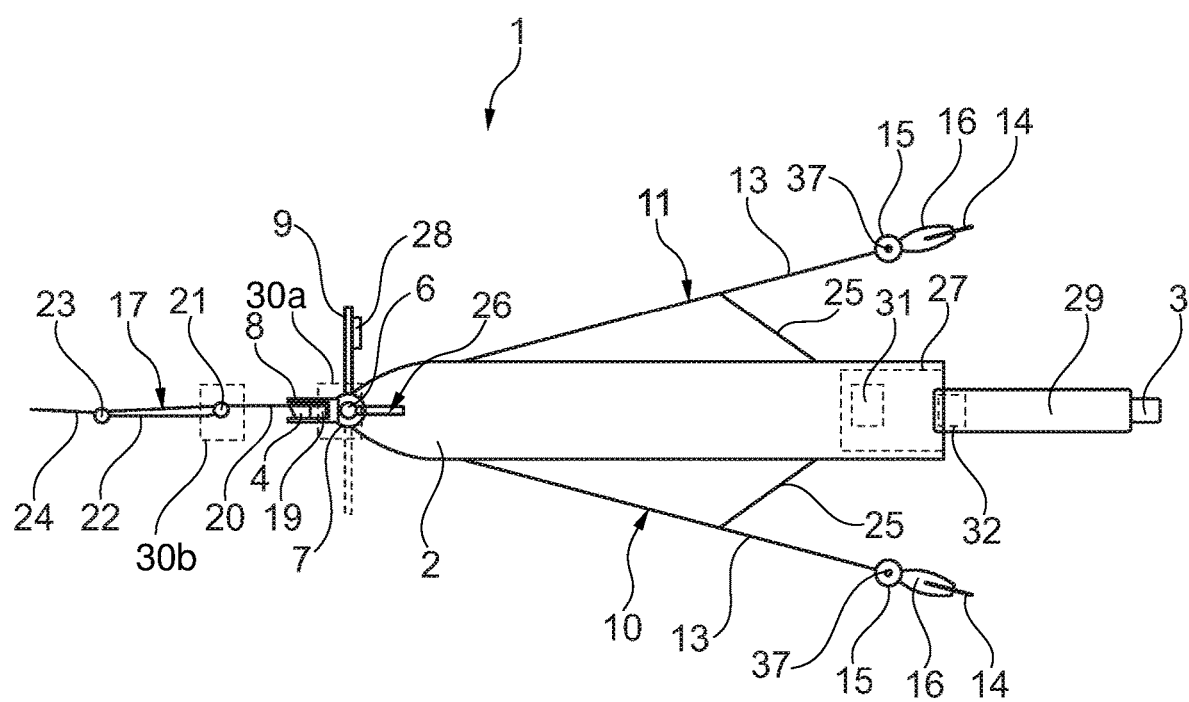
FIG. 3 is a diagrammatic view from above of the scooter shown in FIG. 1 in the second function state.

FIG. 1 shows a diagrammatic side view of an exemplary embodiment of a scooter 1 according to the invention in a first function state, FIG. 2 shows a diagrammatic side view of the scooter shown in FIG. 1 in a second function state, and FIG. 3 shows a diagrammatic view from above of the scooter shown in FIG. 1 in the second function state.

The scooter 1 comprises a central deck 2 on which a load may be placed, and which extends substantially between a rear wheel 3 of the scooter 1 and a steerable front wheel 4 of the scooter 1. In the rear area, the deck 2 is connected to a rear wheel fork 5 on which the rear wheel 3 is rotatably mounted.

The scooter 1 furthermore comprises a steering rod 6 (alternatively referred to as a steering column) for steering the steerable wheel 4. The steering rod 6 is mounted rotatably in a steering bearing 7, and connected rotationally fixedly to a front wheel fork 8 on which the front wheel 4 is rotatably mounted. Also, the steering rod 6 carries a handlebar 9, via which the steering rod 6 can be operated. The steering rod 6 is connected to the deck 2 via a joint 26 which can be locked in at least two function positions. In this way, the scooter 1 may be folded up in that, after releasing the lock of the joint 26, the steering rod 6 may be pivoted in the direction of the deck 2 (clockwise, as viewed in FIG. 1) so that the steering rod lays generally parallel with and closely adjacent to the deck 2.

The scooter 1 comprises two outriggers 10 and 11 arranged on opposite sides of the deck 2, of which FIGS. 1 and 2 show only the left outrigger 10, while the right outrigger 11 is shown only in FIG. 3.

Each outrigger 10 and 11 comprises a strut 13 which is hinge-mounted on the deck 2 via a joint 12 so as to be pivotable in a plane generally parallel with the deck between a retracted or stowed position shown in FIG. 1 and an extended support or deployed position shown in FIGS. 2 and 3. A outrigger wheel 14 is mounted movably on each strut 13. The outrigger wheel 14 can be transferred from a stowed or stowed position shown in FIG. 1 to a support or lowered position shown in FIGS. 2 and 3, and vice versa, via a fork-shaped support lever pivotably mounted on the strut 13 via a joint 15 and holding the outrigger wheel 14. As FIG. 3 in particular shows, the deck 2 and the struts 13, when the struts 13 are in their support position, form a broader loading surface than the deck 2 alone. When in the stowed positions, struts 13 are aligned generally parallel with the deck 2 and lie closely adjacent to and preferably beneath the deck.

The scooter 1 further comprises a control arm 17 which is connected to the steering rod 6 so as to be immovable relative to the steering rod 6 in a turn direction (clockwise and counterclockwise) about a longitudinal center axis 18 of the steering rod 6. The control arm 17 comprises a first arm section 20 which is connected to the steering rod 6 so as to be pivotable about a pivot axis 19 oriented transversely to the longitudinal center axis 18 of the steering rod 6. The first arm section 20 is pivotable about the axis 19 between a retracted or stowed position wherein it lies closely adjacent to the steering rod 6 as shown in FIG. 1, and an extended operating position shown in FIGS. 2 and 3.

The control arm 17 further comprises a second arm section 22 which is connected to the first arm section 20 so as to be pivotable about a pivot axis 21 oriented transversely to a longitudinal center axis 18 of the steering rod 6. The second arm section 22 is pivotable about the axis 21 between a retracted or stowed position shown in FIG. 1 and an extended operating position shown in FIGS. 2 and 3.

The control arm 17 further comprises a handle 24 which is connected to the second arm section 22 so as to be pivotable about a pivot axis 23 oriented transversely to the longitudinal center axis 18 of the steering rod 6. The handle 24 is connected to the second arm section 22 so as to be pivotable between a retracted stowed position shown in FIG. 1 and an extended operating position shown in FIGS. 2 and 3.

The scooter 1 furthermore comprises two support braces 25 which are each connected movably to a respective one of the struts 13, as shown in FIG. 3, and are connected movably to the deck 2.

The scooter 1 may have at least one securing means (not shown) for securing the retracted stowed position and/or the extended support position of the respective strut 13, the stowed position and/or the support position of the respective outrigger wheel 14, and/or the retracted stowed position and/or the extended operating position of the arm sections 20 and 22.

The scooter 1 moreover comprises an electric drive 27 indicated diagrammatically, with an electric motor (not shown) for driving the rear wheel 3 and an operating control 28 arranged on the handlebar 9 for controlling the electric motor.

The scooter 1 comprises at least one sensor unit 30a, 30b, indicated diagrammatically in two alternative positions: Sensor unit 30a is operative to detect a momentary angle (and/or a change of the angle) between the arm section 20 and the steering rod 6, and sensor unit 30b is operative to detect a momentary angle (and/or a change of the angle) between the two arm section 20 and 22. The electric drive 27 comprises a data processing unit 31 connected to the sensor unit 30 and indicated diagrammatically, which is configured to control and/or regulate the electric motor depending on the detected momentary angle.

The scooter 1 also comprises an operating element 29 partially shielding the rear wheel 3 from above, operation of which allows performance of a braking process. The scooter 1 furthermore comprises a sensor device 32 which is connected to the data processing unit 31 and detects the momentary position of the operating element 29. The data processing unit 31 is configured to control and/or regulate the electric motor depending on the detected momentary position of the operating element 29 to effect regenerative braking.

Furthermore, the scooter 1 comprises a seat unit 33 (indicated diagrammatically) which can be connected to the deck 2 in such a manner as to be removable non-destructively, with a support 34 which can be connected to the deck 2, and a seat part 35 which is connected to the support 34 and forms a seat surface.

FIG. 1 shows a first function state of the scooter 1 in which the outriggers 10 and 11 are in their respective stowed state and the control arm 17 is in its stowed state. In contrast, FIGS. 2 and 3 show a second function state of the scooter 1 in which the outriggers 10 and 11 are in their respective supporting states and the control arm 17 is in its operating state.

As FIG. 2 shows, in the second function state, the scooter 1 may be used in particular to transport an object 36 (indicated schematically) in the form of a suitcase. A person can then pull the scooter 1 behind him/her with the powered motive support of the electric drive 27 and at the same time steer the scooter 1 using the control arm 17. FIG. 2 also shows that each outrigger wheel 14, in its support position, is arranged on the respective strut 13 so as to be pivotable about a respective rotation axis 37 oriented parallel to the scooter vertical axis. The same is shown in FIG. 3.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A scooter comprising:
a load-carrying deck;
a front wheel rotatable relative to the deck about a steering axis to steer the scooter;
a steering rod extending upward from the front wheel and rotatable about the steering axis to steer the front wheel;
a rear wheel mounted to the deck;
a control arm attached to the steering rod and movable relative to the rod between a folded position lying adjacent to the rod and an operating position wherein the arm extends forward from the steering rod and lateral movement of the arm causes the steering rod to rotate about the steering axis;
left and right outriggers mounted to the deck and pivotable relative to the deck between respective retracted positions wherein the outriggers are located beneath the deck and respective support positions wherein the outriggers extend outboard to respective left and right sides of the deck, each outrigger having a wheel which is disposed in a ground-contact position when the outrigger is in the support position;
an electric motor driving the rear wheel; and
a sensor operative to detect movement of the arm and provide control inputs actuating the electric motor in response to the detected movement.
2. The scooter of claim 1, wherein the sensor detects an angle between the control arm and the steering rod.
3. The scooter of claim 1, wherein the control arm comprises first and second sections movable relative to one another, and the sensor detects the relative movement.
4. The scooter of claim 3, wherein the first and second sections are connected together for relative pivoting movement, and the sensor detects an angle between the first and second sections.
5. The scooter of claim 4, wherein the relative pivoting movement between the first and second sections is about a pivot axis oriented transversely to a longitudinal axis of the steering rod.
6. The scooter of claim 1, further comprising:
an operating element adjacent to the rear wheel and movable relative to the deck; and
a second sensor operative to detect a position of the operating element and provide control inputs to the electric motor in response to the detected position and cause the electric motor to effect regenerative braking.
7. A scooter comprising:
a control arm attached to a steering rod extending upward from a steerable wheel and movable relative to the rod between a folded position aligned with the rod and an operating position wherein the arm extends forward from the steering rod and lateral movement of the arm causes the steering rod to rotate about the steering axis;
left and right outriggers mounted to a load-carrying deck and pivotable relative to the deck between respective retracted positions wherein the outriggers are located beneath the deck and respective support positions wherein the outriggers extend outboard to respective left and right sides of the deck, each outrigger having a wheel which is disposed in a ground-contact position when the outrigger is in the support position;
an electric motor driving a rear wheel; and
a sensor operative to detect movement of the arm and provide control inputs actuating the electric motor in response to the detected movement.
8. The scooter of claim 7, wherein the sensor detects an angle between the control arm and the steering rod.
9. The scooter of claim 7, wherein the control arm comprises first and second sections movable relative to one another, and the sensor detects said relative movement.

10. The scooter of claim 9, wherein the first and second sections are connected together for relative pivoting movement, and the sensor detects an angle between the first and second sections.

11. The scooter of claim 10, wherein the relative pivoting movement between the first and second sections is about a pivot axis oriented transversely to a longitudinal axis of the steering rod.

12. The scooter of claim 7, further comprising:
an operating element adjacent to the rear wheel and movable relative to the deck; and
a second sensor operative to detect a position of the operating element and provide control inputs to the electric motor in response thereto to effect regenerative braking.

13. A scooter comprising:
left and right outriggers mounted to a load-carrying deck to pivot between retracted positions beneath the deck and support positions extending outboard to respective left and right sides of the deck;
an arm attached to a rod extending upward from a steerable wheel and pivotable relative to the rod between a stowed position aligned with the rod and an operating position extending forward from the rod to enable steering of the wheel via the rod;
an electric motor driving a rear wheel mounted to the deck; and
a sensor operative to detect movement of the arm and provide control inputs actuating the electric motor in response to the detected movement.

14. The scooter of claim 13, wherein the sensor detects an angle between the arm and the rod.

15. The scooter of claim 13, wherein the arm comprises first and second sections movable relative to one another, and the sensor detects said relative movement.

16. The scooter of claim 15, wherein the first and second sections are connected together for relative pivoting movement, and the sensor detects an angle between the first and second sections.

17. The scooter of claim 16, wherein the relative pivoting movement between the first and second sections is about a pivot axis oriented transversely to a longitudinal axis of the rod.

* * * * *